US009246342B2

(12) United States Patent
Kondo

(10) Patent No.: US 9,246,342 B2
(45) Date of Patent: Jan. 26, 2016

(54) CHARGING SYSTEM FOR PORTABLE ELECTRONIC EQUIPMENT

(71) Applicant: Semiconductor Components Industries, LLC, Phoenix, AZ (US)

(72) Inventor: Hideo Kondo, Ora-gun (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 176 days.

(21) Appl. No.: 13/938,867

(22) Filed: Jul. 10, 2013

(65) Prior Publication Data

US 2014/0015476 A1  Jan. 16, 2014

(30) Foreign Application Priority Data

Jul. 11, 2012  (JP) .................................. 2012-155358

(51) Int. Cl.
*H02J 7/00* (2006.01)

(52) U.S. Cl.
CPC ....... *H02J 7/0029* (2013.01); *H02J 2007/0001* (2013.01); *H02J 2007/0039* (2013.01); *H02J 2007/0062* (2013.01)

(58) Field of Classification Search
CPC ....... H02J 7/0029; H02J 7/0045; H02J 7/006; H02J 7/008; H02J 7/044; H02J 7/0062; H02J 7/0054; H01M 10/44

USPC .......................................................... 320/107
See application file for complete search history.

(56) References Cited

U.S. PATENT DOCUMENTS

2009/0033363 A1 * 2/2009 Hurtz et al. .................... 326/57
2011/0241627 A1   10/2011 Arai et al.

FOREIGN PATENT DOCUMENTS

JP   2011-223669   11/2011

* cited by examiner

*Primary Examiner* — Vuthe Siek
(74) *Attorney, Agent, or Firm* — Robert F. Hightower

(57) ABSTRACT

In a charging system for portable electronic equipment, providing the charging current is automatically restarted even in the case where an amount of charging current taken into the portable electronic equipment exceeds charging current providing capacity of a USB battery charger and the USB battery charger stops providing the charging current. When a voltage at a VBUS terminal is lower than a first predetermined voltage, a CPU assumes that the USB battery charger has stopped providing the charging current and turns off a first switching device. And the CPU turns on a second switching device for a predetermined period of time. As a result, the voltage at the VBUS terminal falls to 0.7V or below during the predetermined period of time. In response to the change in the voltage at the VBUS terminal, the USB battery charger restarts providing the charging current to the VBUS terminal.

17 Claims, 5 Drawing Sheets

CHARGING SYSTEM FOR PORTABLE ELECTRONIC EQUIPMENT

CROSS-REFERENCE OF THE INVENTION

This application claims priority from Japanese Patent Application No. 2012-155358, filed Jul. 11, 2012, the content of which is incorporated herein by reference in its entirety.

BACKGROUND OF THE INVENTION

1. Field of the Invention

This invention relates to a charging system for portable electronic equipment, specifically to a charging system that charges a rechargeable battery (secondary battery) incorporated in the portable electronic equipment through a USB (Universal Serial Bus) interface.

2. Description of the Related Art

The USB is an industry standard of a universal serial bus to connect various kinds of peripheral devices to a host device. In recent years, a USB battery charger using the USB has come into use in order to charge a battery incorporated in portable electronic equipment such as a mobile phone. When the portable electronic equipment is connected to the USB battery charger through a USB cable, the battery incorporated in the portable electronic equipment is charged through a VBUS terminal (power supply terminal) in a USB connector.

In addition to a conventional USB hub, there have appeared dedicated battery chargers (indoor on-wall type battery charger, in-car battery charger, etc.), accessory charger adapters and USB battery chargers for tablets.

There are various types of USB battery chargers that differ from each other in charging current providing capacity (0.1 A, 0.5 A or 2.1 A, for example). Therefore, the portable electronic equipment identifies the type of the battery charger by monitoring voltages at data terminals D+ and D− in the USB connector and limits an amount of charging current to take-in by a current limiting circuit in accordance with the charging current providing capacity. If the portable electronic equipment takes in the charging current exceeding the charging current providing capacity of the USB battery charger, a voltage at the VBUS terminal is reduced because of a reduction in an input impedance of the portable electronic equipment. Thus, the USB battery charger stops providing the charging current as specified by the USB standard so as to prevent destruction of the device or the like.

The charging system using the USB battery charger is disclosed in Japanese Patent Application Publication No. 2011-223669, for example.

In some cases, however, monitoring the voltages at the data terminals D+ and D− is performed incorrectly due to influence of chattering noise caused when the portable electronic equipment is connected to the USB battery charger. As a result, there is a possibility that the type of the USB battery charger would be misidentified and the amount of charging current taken into the portable electronic equipment would exceed the charging current providing capacity of the USB battery charger. Also, there is a possibility that the current limiting circuit would malfunction due to influence of other kind of noise and the amount of charging current taken into the portable electronic equipment would exceed the charging current providing capacity of the battery charger. The USB battery charger stops providing the charging current when the amount of charging current taken into the portable electronic equipment is not limited appropriately. That results in discontinued charging of the battery, which is very inconvenient for the user of the portable electronic equipment.

Considering the above, this invention is directed to automatically restarting providing the charging current in the case where providing the charging current from the USB battery charger is stopped.

SUMMARY OF THE INVENTION

This invention provides a charging system for portable electronic equipment which charges a battery incorporated in the portable electronic equipment by connecting a USB battery charger to it. The charging system has a power supply terminal, a USB connector having first and second data terminals, a first switching device to provide the battery with a charging current outputted from the USB battery charger, a second switching device connected between the power supply terminal and a ground, and a control means to control the first and second switching devices, wherein the control means turns on the first switching device to commence charging the battery, and turns off the first switching device and turns on the second switching device when a voltage at the power supply terminal becomes lower than a first predetermined voltage so that the voltage at the power supply terminal is reduced to a voltage lower than a second predetermined voltage that is lower than the first predetermined voltage.

DETAILED DESCRIPTION OF THE INVENTION

A charging system for portable electronic equipment according to an embodiment of this invention is hereafter explained referring to FIGS. 1-5.

[Overall Structure of Charging System for Portable Electronic Equipment]

Figure 1:
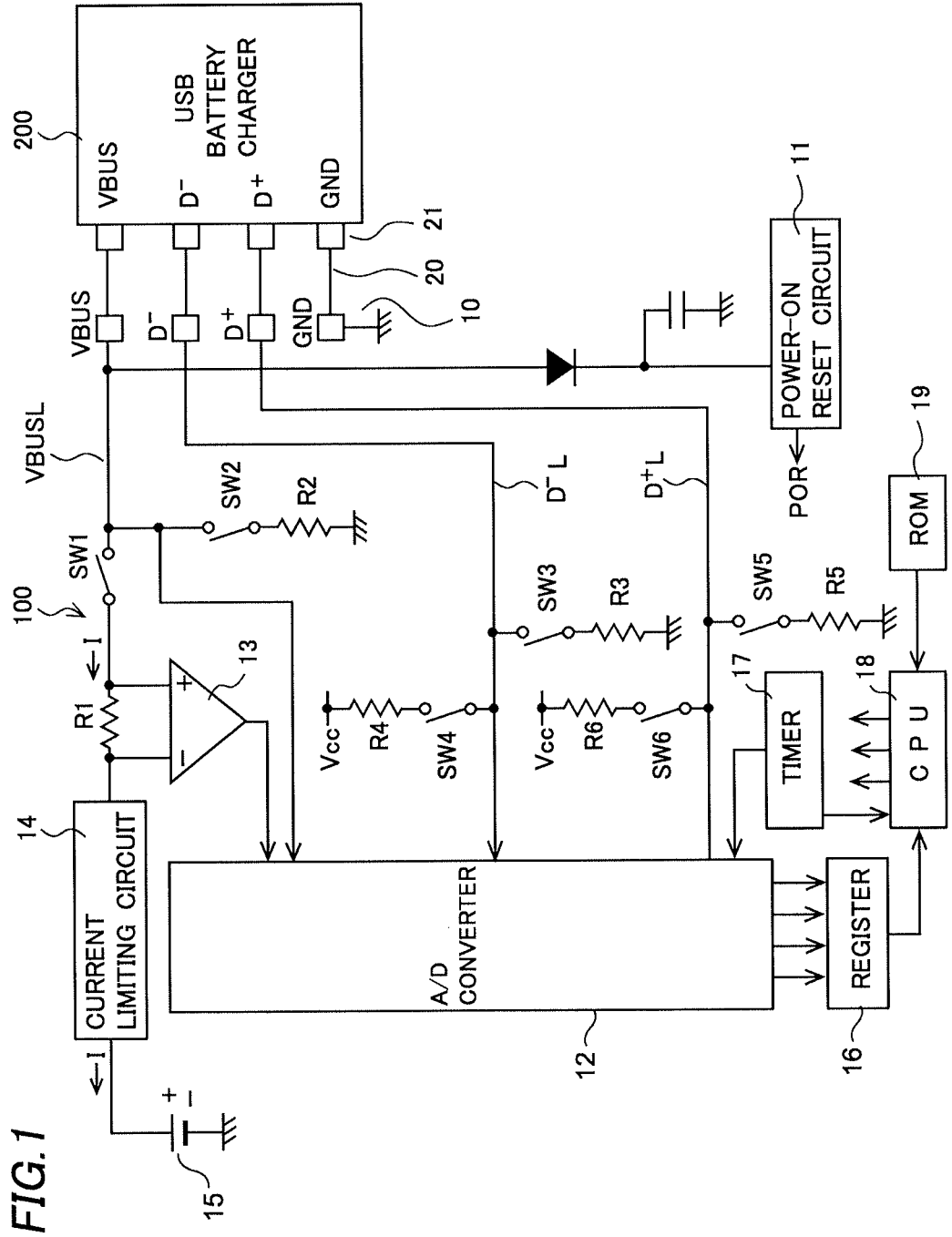
FIG. 1 shows a structure of a charging system for portable electronic equipment according to an embodiment of this invention.

FIG. 1 shows a structure of the charging system for portable electronic equipment according to the embodiment of this invention. As shown in FIG. 1, portable electronic equipment 100 such as a mobile phone includes a USB connector 10, a power-on reset circuit 11, an A/D converter 12, a differential amplifier 13, a current limiting circuit 14, a rechargeable battery 15 (lithium ion battery, for example), a register 16, a timer circuit 17, a CPU 18, a ROM 19 and first through sixth switching devices SW1-SW6.

The CPU 18 controls operations of each unit (operations of the current limiting circuit 14, turning on/off of the first through sixth switching devices SW1-SW6, for example) by outputting control signals to each unit in the portable electronic equipment 100 in accordance with a program read out from the ROM 19. The USB connector 10 in the portable electronic equipment 100 has a VBUS terminal (power supply terminal), a first data terminal D+, a second data terminal D− and a ground terminal GND. Each of the terminals of the USB connector 10 in the portable electronic equipment 100 is connected to corresponding each of terminals of a USB connector 21 in a USB battery charger 200 that serves as a host device.

[Structure of Each Unit in Portable Electronic Equipment 100]

A structure of each unit in the portable electronic equipment 100 is hereafter explained referring to FIGS. 1, 2, 4A, 4B and 5. When the USB connector 10 in the portable electronic equipment 100 is connected to the USB battery charger 200 through a USB cable 20 and a DC power supply (5V, for example) is provided from the USB battery charger 200 to the VBUS terminal, the power-on reset circuit 11 confirms turning-on of the power supply and outputs a reset signal POR. The portable electronic equipment 100 is configured so as to be reset by the reset signal POR and activated.

The first switching device SW1 is inserted in a power supply line VBUSL that forms a current path of a charging current I flowing from the VBUS terminal to the battery 15. One end of the power supply line VBUSL is connected to the VBUS terminal while the other end of the power supply line VBUSL is connected to a positive terminal + of the battery 15 through the first switching device SW1, a first resistor R1 for current detection and the current limiting circuit 14.

When the USB connector 10 in the portable electronic equipment 100 is connected to the USB battery charger 200 and the first switching device SW1 is turned on, the charging current I flows through the power supply line VBUL from the VBUS terminal to charge the battery 15. The charging current I causes an electric potential difference across both ends of the first resistor R1 for current detection in this situation. The differential amplifier 13 amplifies and outputs the electric potential difference. Then the output from the differential amplifier 13 is converted into digital data by the A/D converter 12 to be used to control the current limiting circuit 14 that is to be described.

The second switching device SW2 and a second resistor R2 are connected in series between the VBUS terminal and the ground (0V). When a voltage at the VBUS terminal becomes lower than a first predetermined voltage (4V, for example), the CPU 18 assumes that the USB battery charger 200 has stopped providing the charging current I and turns off the first switching device SW1 as well as turning on the second switching device SW2.

When the second switching device SW2 is turned on, the voltage at the VBUS terminal becomes lower than a second predetermined voltage (0.7V, for example) that is lower than the first predetermined voltage. The USB battery charger 200 is structured so as to restart providing the charging current I when the voltage at the VBUS terminal stays at the voltage lower than the second predetermined voltage (0.7V, for example) for a predetermined period (300 msec-900 msec) that is set by the timer 17, as specified by the USB standard. The first and second switching devices SW1 and SW2 may be formed of MOS transistors or bipolar transistors.

The A/D converter 12, an example of the voltage detection circuit, converts the voltage at the VBUS terminal, a voltage at the first data terminal D+, a voltage at the second data terminal D− and the output from the differential amplifier 13 into corresponding digital data, respectively. Then, each of the digital data is stored in the register 16.

Figure 4A:
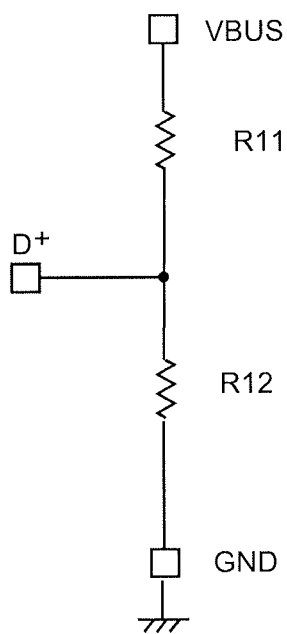
FIGS. 4A and 4B show a type of a USB battery charger.
Figure 4B:
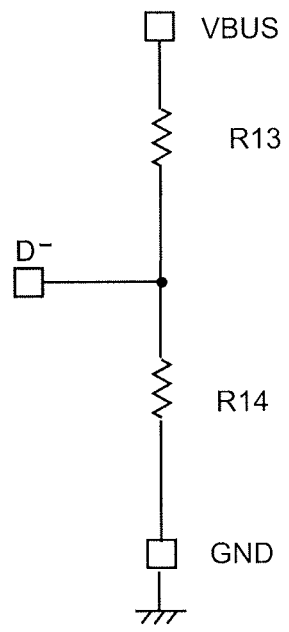

The CPU identifies charging current providing capacity (0.1 A, 0.5 A or 2.1 A, for example) of the USB battery charger 200 connected to the portable electronic equipment 100 based on the digital data corresponding to the voltages at the first data terminal D+ and the second data terminal D− stored in the register 16. In a certain type of USB battery charger 200, the first data terminal D+ in the USB battery charger 200 is connected to a connecting node between resistors R11 and R12 that are connected in series between the VBUS terminal and the ground terminal, as shown in FIG. 4A. The second data terminal D− is connected to a connecting node between resistors R13 and R14 that are connected in series between the VBUS terminal and the ground terminal, as shown in FIG. 4B.

Resistances of the resistors R11-R14 are set in accordance with the charging current providing capacity and the voltage at the first data terminal D+ and the voltage at the second data terminal D− are generated accordingly. Thus, it is made possible to identify the charging current providing capacity of the USB battery charger 200 by detecting the voltages at the first and second data terminals D+ and D− in a state in which the portable electronic equipment 100 is connected to the USB battery charger 200.

Figure 5:
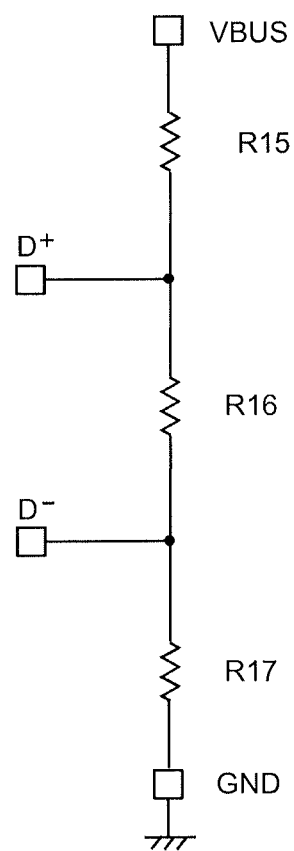
FIG. 5 shows another type of the USB battery charger.

In another type of battery charger 200, resistors R15, R16 and R17 are connected in series between the VBUS terminal and the ground terminal, as shown in FIG. 5. The first data terminal D+ in the USB battery charger 200 is connected to a connecting node between the resistors R15 and R16 while the second data terminal D− is connected to a connecting node between the resistors R16 and R17. That is, the first data terminal D+ and the second data terminal D− are short-circuited through the resistor R16. A resistance of the resistor R16 is set to be significantly smaller than resistances of the resistors R15 and R17.

In this case, a first data line D+L is provided between the first data terminal D+ and the A/D converter 12, while a second data line D−L is provided between the second data terminal D− and the A/D converter 12. In order to detect whether the first data terminal D+ and the second data terminal D− are short-circuited or not, there are provided third through sixth switching devices SW3-SW6 and third through sixth resistors R3-R6. The first through sixth switching devices SW1-SW6 may be formed of MOS transistors or bipolar transistors.

The fifth switching device SW5 and the fifth resistor R5 are connected in series between the first data line D+L and the ground. The sixth switching device SW6 and the sixth resistor R6 are connected in series between the first data line D+L and an internal power supply voltage Vcc. The internal power supply voltage Vcc may be generated from the battery 15 or the VBUS terminal and may be set equal to the voltage at the VBUS terminal, for example.

Similarly, the third switching device SW3 and the third resistor R3 are connected in series between the second data line D−L and the ground. The fourth switching device SW4 and the fourth resistor R4 are connected in series between the second data line D−L and the internal power supply voltage Vcc. Resistances of the third through sixth resistors R3-R6 are set significantly smaller than the resistances of the resistors R15 and R17.

When the fifth switching device SW5 is turned on, the first data line D+L is pulled down to nearly 0V (ground voltage). If the first data terminal D+ and the second data terminal D− are short-circuited as shown in FIG. 5, the second data terminal D− also becomes nearly 0V in the state in which the portable electronic equipment 100 is connected to the USB battery charger 200. Therefore, the type of the USB battery charger 200 as shown in FIG. 5 can be identified because whether the first data terminal D+ and the second data terminal D− are short-circuited can be found by detecting the voltages at the first and second data terminals D+ and D−.

Identifying the type of the USB battery charger 200 as described above may be also performed using the third switching device SW3, the fourth switching device SW4 or the sixth switching device SW6. For example, when the fourth switching device SW4 is turned on, the second data line D−L is pulled up to nearly Vcc (5V, for example). If the first data terminal D+ and the second data terminal D− are short-circuited, the first data terminal D+ also becomes nearly Vcc in the state in which the portable electronic equipment 100 is connected to the USB battery charger 200.

As described above, whether the first data terminal D+ and the second data terminal D− are short-circuited or not can be found by pulling up or pulling down one of the first and second data lines D+L and D−L and detecting the voltage on the other. Or, all the third through sixth switching devices SW3-SW6 may be used so that the identification is securely performed. The third through sixth switching devices SW3-SW6 may be formed of MOS transistors or bipolar transistors.

The current limiting circuit 14 limits the charging current I provided to the battery 15 to an mount within a range of the charging current providing capacity of the USB battery charger 200 identified as described above. When the charging current providing capacity of the USB battery charger 200 is identified as 0.5 A, for example, the current limiting circuit 14 limits the amount of charging current I taken into the portable electronic equipment to 0.5 A.

Figure 2:
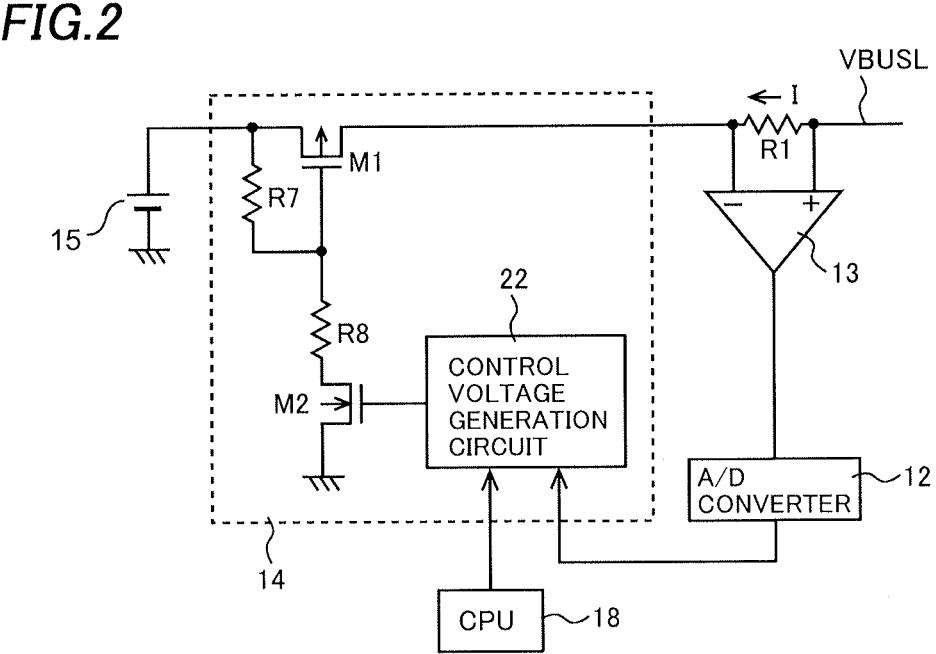
FIG. 2 is a circuit diagram of a current limiting circuit.

FIG. 2 shows an example of a concrete circuit of the current limiting circuit 14. The current limiting circuit 14 is includes a P-channel type MOS transistor M1, an N-channel type MOS transistor M2, a seventh resistor R7, an eighth resistor R8 and a control voltage generation circuit 22.

The P-channel type MOS transistor M1 is inserted in the power supply line VBUSL, and the seventh resistor R7 is connected between its drain and gate. The eighth resistor R8 and the N-channel type MOS transistor M2 are connected in series between the gate of the P-channel type MOS transistor M1 and the ground. A source of the N-channel type MOS transistor M2 is connected to the ground.

The CPU 18 outputs charging current providing capacity data corresponding to the charging current providing capacity of the USB battery charger 200, which is identified as described above. The differential amplifier 13 amplifies and outputs the electric potential difference across both ends of the first resistor R1 for current detection, which is caused by the charging current I. The output from the differential amplifier 13 is converted into the digital data by the A/D converter 12. The digital data corresponds to charging current data corresponding to the charging current I that flows actually.

The control voltage generation circuit 22 generates a control voltage based on the charging current providing capacity data from the CPU 18 and the charging current data and applies the control voltage to a gate of the N-channel type MOS transistor M2 so that the charging current I becomes a predetermined value equal to or smaller than the charging current providing capacity of the USB battery charger 200. An impedance of the N-channel type MOS transistor M2 is controlled in accordance with the control voltage. A gate voltage of the P-channel type MOS transistor M1 is controlled accordingly so that the charging current I flowing through the P-channel type MOS transistor M1 is controlled to the amount within the range of the charging current providing capacity of the USB battery charger 200.

[Operations of Charging System]

Figure 3:
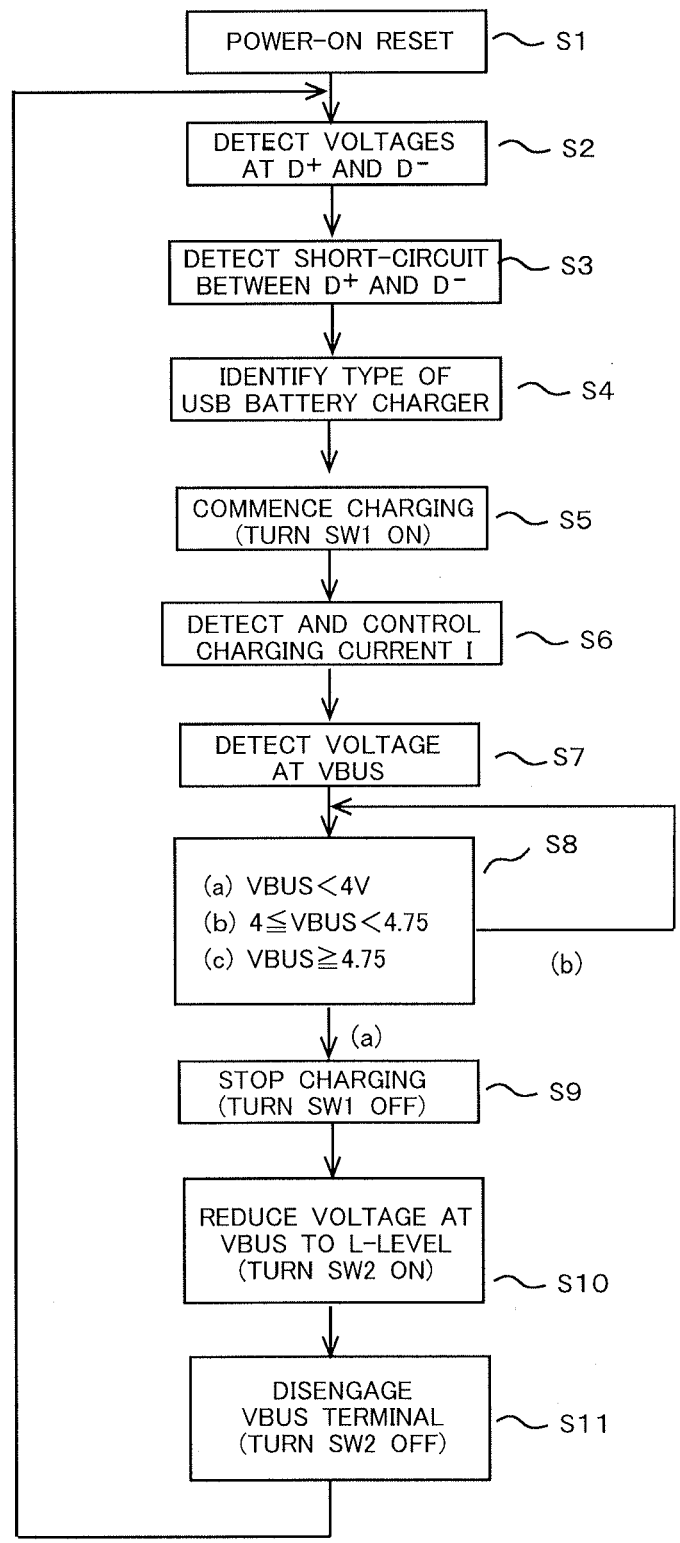
FIG. 3 is a flow chart to explain a sequence of operations of the charging system for portable electronic equipment according to the embodiment of this invention.

Next, a sequence of the operations of the charging system structured as described above will be explained referring to a flowchart shown in FIG. 3. The operations to be described below are performed by executing the program that is read out from the ROM 19 by the CPU 18.

First, in a step S1, the VBUS terminal in the portable electronic equipment 100 is provided with the power supply when the portable electronic equipment 100 is connected to the USB battery charger 200. With this, the power-on reset circuit 11 is put into operation to output the reset signal POR. Upon it, the portable electronic equipment 100 including the CPU 18 is activated.

In a step S2, the voltages at the first data terminal D+ and the second data terminal D− are detected. In a step S3, whether the first data terminal D+ and the second data terminal D− are short-circuited is detected.

In a step S4, the CPU 18 identifies the type of the USB battery charger 200 based on results of the detections performed in the steps S2 and S3. The voltages at the first data terminal D+ and the second data terminal D− detected in the step S2 are converted into the digital data by the A/D converter 12 and transferred into the register 16.

Then, the CPU 18 identifies the type (the charging current providing capacity) of the USB battery charger 200 based on the digital data representing the voltages at the first data terminal D+ and the second data terminal D−, which is stored in the register 16. The CPU 18 may identify the type of the battery charger 200 by referring table data showing correlations between the voltages at the first data terminal D+ and the second data terminal D− and the type of the battery charger 200. It is preferable that the table data is stored in advance in a non-volatile memory such as an EEPROM incorporated in the portable electronic equipment 100 and renewed when a new type of the battery charter 200 is introduced.

When the first data terminal D+ and the second data terminal D− are found short-circuited in the step S3, the CPU 18 identifies that the USB battery charger 200 connected to the portable electronic equipment 100 is of the type as shown in FIG. 5.

In a step S5, the CPU 18 turns on the first switching device SW1. As a result, providing the charging current I from the VBUS terminal to the battery 15 through the first switching device SW1 is commenced.

In a step S6, the charging current I is detected through the differential amplifier 13. And the amount of the charging current I is limited by the current limiting circuit 14 to the amount of current corresponding to the charging current providing capacity of the USB battery charger 200 identified in the step S4.

In a step S7, the voltage at the VBUS terminal is detected at regular intervals (once every 10 seconds, for example). The voltage at the VBUS terminal is converted into digital data by the A/D converter 12 and stored in the register 16.

In a step S8, the CPU 18 judges whether the voltage at the VBUS terminal is lower than the first predetermined voltage (4V, for example) or not based on the digital data stored in the register 16.

(a) In the case where the voltage at the VBUS terminal is judged to be lower than the first predetermined voltage (4V, for example) in the step S8, the CPU 18 assumes that the USB battery charger 200 has stopped providing the charging current I and advances the sequence to a subsequent step S9 in which the first switching device SW1 is turned off.

(b) In the case where the voltage at the VBUS terminal is judged to be equal to or higher than the first predetermined voltage (4V, for example) and lower than a third predetermined voltage (4.75V, for example) in the step S8, the CPU 18 assumes that the voltage is in a gray zone in which whether the battery charger 200 has stopped providing the charging current I can be not determined and the sequence returns to the step S7.

(c) In the case where the voltage at the VBUS terminal is judged to be equal to or higher than the third predetermined voltage (4.75V, for example) in the step S8, the CPU assumes that the battery 15 is under normal charging, and keeps the charging through the first switching device SW1. In this case, monitoring the voltage at the VBUS terminal is also continued, and the first switching device SW1 may be turned off to terminate the charging when the voltage reaches a voltage indicating that the battery 15 is fully charged.

In the case where the sequence advances from the step S9 to a step S10, the CPU 18 turns on the second switching device SW2 for the predetermined period of time (300 msec-900 msec). As a result, the voltage at the VBUS terminal falls to 0.7V or below during the predetermined period of time. In response to the change in the voltage at the VBUS terminal, the USB battery charger 200 restarts providing the charging current I to the VBUS terminal.

After the predetermined period of time, the sequence proceeds to a step S11 in which the CPU 18 turns off the second switching device SW2 to disengage the VBUS terminal. After that, the sequence returns to the step S2. Thus, the voltages at the first data terminal D+ and the second data terminal D− are detected again, whether the first data terminal D+ and the second data terminal D− are short-circuited is detected again, and the digital data stored in the register 16 is updated.

In the step S4, the CPU 18 re-identifies the type (the charging current providing capacity) of the USB battery charger 200, and the charging current I is controlled by the current limiting circuit 14 in the step S6 based on the updated information on the type (charging current providing capacity) of the USB battery charger 200.

Therefore, even in the case where the amount of charging current taken into the portable electronic equipment 100 exceeds the charging current providing capacity of the battery charger 200 and the USB battery charger 200 stops providing the charging current I because of incorrect monitoring of the voltages at the first data terminal D+ and the second data terminal D− or malfunctioning of the current limiting circuit 14 due to the influence of noise, it is made possible to restart providing the charging current I so that charging the battery 15 is continued.

Since the type of the battery charger 200 is re-identified thereafter and the charging current I is controlled by the current limiting circuit 14 based on the updated information on the type of the USB battery charger 200, the amount of charging current I taken into the portable electronic equipment 100 is prevented from exceeding the charging current providing capacity of the battery charger 200.

With the charging system for the portable electronic equipment according to the embodiment of this invention, it is made possible that providing the charging current I is automatically restarted even in the case where the amount of charging current I taken into the portable electronic equipment 100 exceeds the charging current providing capacity of the battery charger 200 and the USB battery charger 200 stops providing the charging current I.

What is claimed is:

1. A charging system for portable electronic equipment to charge a battery incorporated in the portable electronic equipment by connecting a USB battery charger to the portable electronic equipment, the charging system comprising:
a power supply terminal;
a first switching device providing the battery with a charging current received at the power supply terminal from the USB battery charger;
a second switching device connected between the power supply terminal and a ground;
a control circuit controlling the first and second switching devices, wherein the control circuit turns on the first switching device to commence providing the battery with the charging current and, in response to a voltage at the power supply terminal having a first value that is lower than a first predetermined voltage, turns off the first switching device and turns on the second switching device so that the voltage at the power supply terminal is reduced to a second value that is lower than a second predetermined voltage, the second predetermined voltage being lower than the first predetermined voltage; and
the charging system configured to maintain the power supply terminal at substantially the second value for a predetermined period of time.

2. The charging system for the portable electronic equipment of claim 1, further comprising a USB connector comprising a first data terminal and a second data terminal.

3. The charging system for the portable electronic equipment of claim 2, further comprising a voltage detection circuit to detect voltages at the first and second data terminals, wherein the control circuit identifies a charging current providing capacity of the USB battery charger based on the voltages at the first and second data terminals detected by the voltage detection circuit.

4. The charging system for the portable electronic equipment of claim 3, further comprising a current limiting circuit to limit an amount of the charging current provided to the battery to an amount of current corresponding to the charging current providing capacity.

5. The charging system for the portable electronic equipment of claim 4, wherein the control circuit identifies the charging current providing capacity before the first switching device is turned on.

6. The charging system for the portable electronic equipment of claim 5, wherein the control circuit re-identifies the charging current providing capacity after the predetermined period of time during which the second switching device is turned on.

7. A charging system for portable electronic equipment, comprising:
portable electronic equipment incorporating a battery; and
a USB battery charger to charge the battery, wherein the portable electronic equipment comprises a power supply terminal, a first switching device providing the battery with a charging current received at the power supply terminal from the USB battery charger, a second switching device connected between the power supply terminal and a ground, and a control circuit controlling the first and second switching devices, the control circuit turning on the first switching device to commence providing the battery with the charging current and, in response to a voltage at the power supply terminal is lower than a first predetermined voltage, turning off the first switching device and turning on the second switching device so that the voltage at the power supply terminal is reduced to a first value that is lower than a second predetermined voltage, the second predetermined voltage being lower than the first predetermined voltage and wherein the USB battery charger restarts providing the battery with the charging current when the voltage at the power supply terminal stays at substantially the first value for a predetermined period of time.

8. The charging system for the portable electronic equipment of claim 7, wherein the portable electronic equipment further comprises a USB connector comprising a first data terminal and a second data terminal.

9. The charging system for the portable electronic equipment of claim 8, wherein the portable electronic equipment further comprises a voltage detection circuit to detect voltages at the first and second data terminals, the control circuit identifying a charging current providing capacity of the USB battery charger based on the voltages at the first and second data terminals detected by the voltage detection circuit.

10. The charging system for the portable electronic equipment of claim 9, wherein the portable electronic equipment further comprises a current limiting circuit to limit an amount of the charging current provided to the battery to an amount of current corresponding to substantially the charging current providing capacity.

11. The charging system for the portable electronic equipment of claim 10, wherein the control circuit identifies the charging current providing capacity before the first switching device is turned on.

12. The charging system for the portable electronic equipment of claim 11, wherein the control circuit re-identifies the charging current providing capacity after the predetermined period of time during which the second switching device is turned on.

13. A charging system for portable electronic equipment to charge a battery incorporated therein by connecting a USB battery charger to the portable electronic equipment, comprising:
   a power supply terminal;
   a first switching device providing the battery with a charging current received at the power supply terminal from the USB battery charger;
   a second switching device connected between the power supply terminal and a ground;
   a USB connector comprising a first data terminal and a second data terminal;
   a voltage detection circuit detecting voltages at the first and second data terminals; and
   a control circuit controlling the first and second switching devices and the charging current, wherein the control circuit identifies a charging current providing capacity of the USB battery charger based on the voltages at the first and second data terminals, turns on the first switching device to commence providing the battery with the charging current in accordance with the charging current providing capacity, and, when a voltage at the power supply terminal is lower than a first predetermined voltage, turns off the first switching device and turns on the second switching device so that the voltage at the power supply terminal is reduced to a first value lower than a second predetermined voltage, the second predetermined voltage being lower than the first predetermined voltage; and
   the USB battery charger configured to restart providing the battery with the charging current in response to the voltage at the power supply terminal stays at the first value for a predetermined period of time.

14. The charging system for the portable electronic equipment of claim 13, further comprising a current limiting circuit to limit an amount of the charging current provided to the battery to an amount of current corresponding to substantially the charging current providing capacity.

15. The charging system for the portable electronic equipment of claim 13, wherein the control circuit re-identifies the charging current providing capacity after the predetermined period of time during which the second switching device is turned on.

16. The charging system for the portable electronic equipment of claim 13, further comprising a first data line connected to the first data terminal and a third switching device connected between the first data line and an internal power supply or the ground and controlled by the control circuit, wherein the voltage detection circuit detects the voltage at the second data terminal when the third switching device is turned on.

17. The charging system for the portable electronic equipment of claim 16, further comprising a second data line connected to the second data terminal and a fourth switching device connected between the second data line and the internal power supply or the ground and controlled by the control circuit, wherein the voltage detection circuit detects the voltage at the first data terminal when the fourth switching device is turned on.

* * * * *